(12) United States Patent
Tamai et al.

(10) Patent No.: US 10,953,841 B2
(45) Date of Patent: Mar. 23, 2021

(54) PASSENGER SEAT AIRBAG DEVICE

(71) Applicant: TOYODA GOSEI CO., LTD., Kiyosu (JP)

(72) Inventors: Hiromi Tamai, Kiyosu (JP); Shinichi Ishida, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 16/684,645

(22) Filed: Nov. 15, 2019

(65) Prior Publication Data

US 2020/0156588 A1 May 21, 2020

(30) Foreign Application Priority Data

Nov. 21, 2018 (JP) .............................. JP2018-218715

(51) Int. Cl.
*B60R 21/261* (2011.01)
*B60R 21/205* (2011.01)
*B60R 21/215* (2011.01)
*B60R 21/237* (2006.01)
*B60R 21/16* (2006.01)

(52) U.S. Cl.
CPC .......... *B60R 21/261* (2013.01); *B60R 21/205* (2013.01); *B60R 21/215* (2013.01); *B60R 21/237* (2013.01); *B60R 2021/161* (2013.01)

(58) Field of Classification Search
CPC ................................................ B60R 21/2176
See application file for complete search history.

(56) References Cited

U.S. PATENT DOCUMENTS

| | | | | |
|---|---|---|---|---|
| 6,371,510 | B1 * | 4/2002 | Marriott | B60R 21/201 280/730.1 |
| 8,408,596 | B2 * | 4/2013 | Matsunaga | B60R 21/201 280/743.1 |
| 9,623,832 | B2 * | 4/2017 | Miura | B60R 21/201 |
| 9,663,063 | B2 * | 5/2017 | Kunitake | B60R 21/237 |
| 9,701,273 | B2 * | 7/2017 | Miura | B60R 21/201 |
| 2013/0200664 | A1 * | 8/2013 | Patterson | B60R 21/207 297/216.1 |
| 2015/0115577 | A1 * | 4/2015 | Miura | B60R 21/2334 280/728.2 |

FOREIGN PATENT DOCUMENTS

JP 2016-026942 A 2/2016

* cited by examiner

*Primary Examiner* — Faye M Fleming

(74) *Attorney, Agent, or Firm* — Posz Law Group, PLC

(57) ABSTRACT

A passenger seat airbag device includes an airbag and a regulating member which regulates deploying and inflating of the airbag. The regulating member includes a temporary holding portion which includes a base portion and a cover portion arranged below the base portion and temporarily and releasably holds a folded part of the folded airbag. While the temporary holding portion rotating rearward, the folded part of the folded airbag is released from a release opening. The airbag is folded and stored in a storage part while a rear end side including a rear end of a preliminary folded airbag is arranged below the cover portion of the temporary holding portion and extends forward from the release opening.

2 Claims, 14 Drawing Sheets

A.

B.

PASSENGER SEAT AIRBAG DEVICE

CROSS-REFERENCE TO RELATED APPLICATION

This application claims priority from Japanese Patent Application No. 2018-218715, filed on Nov. 21, 2018, the entire subject matter of which is incorporated herein by reference.

TECHNICAL FIELD

The present invention relates to a passenger seat airbag device configured to be mounted on an instrument panel in front of a passenger seat of a vehicle, and particularly relates to a passenger seat airbag device including an airbag which is folded and stored in a storage part while being assembled with a regulating member for regulating deploying and inflating of a part of the folded airbag.

BACKGROUND ART

There has been known a related-art passenger seat airbag device in which a regulating member for regulating deploying and inflating of an airbag is assembled to the airbag (see, for example, JP-A-2016-26942). The regulating member has flexibility and includes a temporary holding portion which temporarily and releasably holds a folded part of the folded airbag, an attachment portion which is attached to a storage part, and a connection piece portion which connects the attachment portion and the temporary holding portion. The temporary holding portion includes a base portion which is continuous to the connection piece portion, and a cover portion which is connected to the base portion so as to form a holding recess for temporarily holding the folded part between the cover portion and the base portion and is arranged below the base portion when the folded part is temporarily held. A release opening for releasing the folded part from the holding recess is arranged to face rearward. At a time of releasing the folded part when the airbag is deployed and inflated, the folded part is released from the release opening while rotating rearward. An outer peripheral wall at a completion of inflation of the airbag includes an occupant side wall portion which is provided on a rear side thereof to receive an occupant, and a peripheral wall portion which extends forward so as to converge from an outer peripheral edge of the occupant side wall portion. An inflow opening, through which the inflation gas flows into the airbag, is provided at a lower surface of a front end side of the peripheral wall portion. A fully folded body of the airbag stored in the storage part is formed by performing after forming a preliminary folded airbag by flatly unfolding the airbag such that the occupant side wall portion of the airbag is arranged above the inflow opening, a left-right direction reducing and folding step of narrowing a width dimension in a left-right direction of the preliminary folded airbag, and a front-rear direction reducing and folding step of arranging a rear side part on a rear side and a front side part on a front side above the inflow opening, respectively with the inflow opening of the preliminary folded airbag as a center. In the fully folded body of the airbag, a part of the rear side part on the rear side than the inflow opening of the preliminary folded airbag is stored in the temporary holding portion of the regulating member as the folded part.

In the related-art airbag device, the folded part of the rear side part stored in the temporary holding portion of the regulating member includes a rear end of the rear side portion of the preliminary folded airbag. There is room for improvement in that a rear end side of the preliminary folded airbag is rapidly deployed along an upper surface of an instrument panel when the airbag is deployed and inflated.

SUMMARY

Accordingly, the present invention has been made in view of the above circumstances, and an aspect of the present invention provides a passenger seat airbag device capable of rapidly separating from a rear end side of a preliminary folded airbag from a storage part and deploying the rear end side of the preliminary folded airbag along an upper surface of an instrument panel when the airbag is deployed and inflated.

According to an embodiment of the present invention, there is provided a passenger seat airbag device including:

an airbag which is folded and stored in a storage part on an upper surface side of an instrument panel in front of a passenger seat of a vehicle and is configured to protrude rearward while being deployed and inflated from the storage part to complete inflation when inflation gas flows into the airbag; and a regulating member which is attached to the storage part so as to regulate deploying and inflating of a part of the airbag when the airbag is deployed and inflated, wherein the regulating member has flexibility and includes:

a temporary holding portion which is configured to temporarily and releasably hold a folded part of the folded airbag;

an attachment portion which is attached to the storage part; and a connection piece portion which connects the attachment portion and the temporary holding portion, wherein the temporary holding portion includes:

a base portion which is continuous to the connection piece portion; and a cover portion which is connected to the base portion so as to form a holding recess configured to temporarily hold the folded part between the cover portion and the base portion and is arranged below the base portion when the folded part is temporarily held, wherein the temporary holding portion is configured such that a release opening which is configured to release the folded part from the holding recess is arranged to face rearward, and the folded part is released from the release opening while the temporary holding portion rotating rearward at a time of releasing the folded part when the airbag is deployed and inflated, wherein an outer peripheral wall at a completion of inflation of the airbag includes:

an occupant side wall portion which is provided on a rear side thereof to receive an occupant; and a peripheral wall portion which extends forward so as to converge from an outer peripheral edge of the occupant side wall portion, wherein an inflow opening, through which the inflation gas flows into the airbag, is provided at a lower surface of a front end side of the peripheral wall portion, wherein a fully folded body of the airbag stored in the storage part is formed by performing:

after forming a preliminary folded airbag by flatly unfolding the airbag such that the occupant side wall portion of the airbag is arranged above the inflow opening, a left-right direction reducing and folding step of narrowing a width dimension in a left-right direction of the preliminary folded airbag; and a front-rear direction reducing and folding step of arranging a rear side part on a rear side and a front side part on a front side of the preliminary folded airbag above the inflow opening, respectively with the inflow opening of the preliminary folded airbag as a center, wherein a part of the rear side part is stored in the temporary holding portion as the folded part, and wherein the airbag is folded and stored in the storage part while the rear end side including a rear end of the preliminary folded airbag is arranged below the cover portion such that the rear end side is out of the temporary holding portion and extends forward from the release opening.

In the above-described passenger seat airbag device, when the inflation gas flows into the folded airbag, in the rear side part of the preliminary folded airbag, the inflation gas flows into the folded part stored in the temporary holding portion of the regulating member, and the temporary holding portion is rotated rearward to release the folded part from the release opening. At this time, the rear end side of the rear side part, which extends forward from the release opening at a lower side of the cover portion of the temporary holding portion, rotates the rear end upward and further rotates the rear end rearward in accordance with the rotation of the temporary holding portion. Therefore, prior to releasing the folded part from the temporary holding portion, the rear end side of the rear side part rotates upward from a lower side of the temporary holding portion rotating rearward and further rotates rearward, so that the rear end side is separated upward from the storage part and approaches the upper surface of the instrument panel. The folded part stored in the temporary holding portion is released from the release opening of the temporary holding portion and moves rearward while being deployed and inflated. Therefore, rearward movement of the rear end side of the rear side part is promoted, and the rear end side of the rear side part moves rearward along the upper surface of the instrument panel. Then, the occupant side wall portion in the outer peripheral wall of the airbag moves rearward while being widely deployed substantially along the upper-lower direction, so that the airbag is completely inflated. That is, in the above-described airbag device, the rear end side of the rear side part of the preliminary folded airbag is separated from the storage part and approaches the upper surface side of the instrument panel prior to releasing the folded part stored in the temporary holding portion of the regulating member. When the folded part is opened from the release opening and is deployed and inflated rearward, the folded part moves rearward along the upper surface of the instrument panel while being deployed and inflated. Therefore, the occupant side wall portion is widely deployed in the upper-lower direction and moves rearward, so that the airbag is completely inflated.

In the above-described passenger seat airbag device, when the airbag is deployed and inflated, the rear end side of the preliminary folded airbag can be rapidly separated from the storage part and be deployed along the upper surface of the instrument panel. Therefore, the occupant side wall portion of the airbag can be rapidly and widely deployed in the upper-lower direction. Therefore, for example, the above-described passenger seat airbag device can be mounted on a vehicle in which the downward direction of the upper surface side of the instrument panel is increased, so that even when an occupant is approaching, the airbag in a middle of the inflation can smoothly receive and protect the occupant by the occupant side wall portion widely deployed in the upper-lower direction.

In the above-described passenger seat airbag device, the airbag may be folded and stored in the storage part while the rear end of the preliminary folded airbag is arranged in front of the temporary holding portion.

In this configuration, a length of the rear end side in the rear side part of the preliminary folded airbag extending from the release opening of the temporary holding portion is increased. Therefore, the rear end of the rear side part is separated from the storage part such that a rotation radius is increased, and is further arranged on the rear side along the upper surface of the instrument panel by the rotation in accordance with the rearward rotation of the temporary holding portion in an initial stage of the inflation of the airbag. Subsequent deploying of the occupant side wall portion in the upper-lower direction is performed more smoothly, so that the occupant side wall portion widened in the upper-lower direction can smoothly receive and protect the approaching occupant.

DESCRIPTION OF EMBODIMENTS

Figure 1:
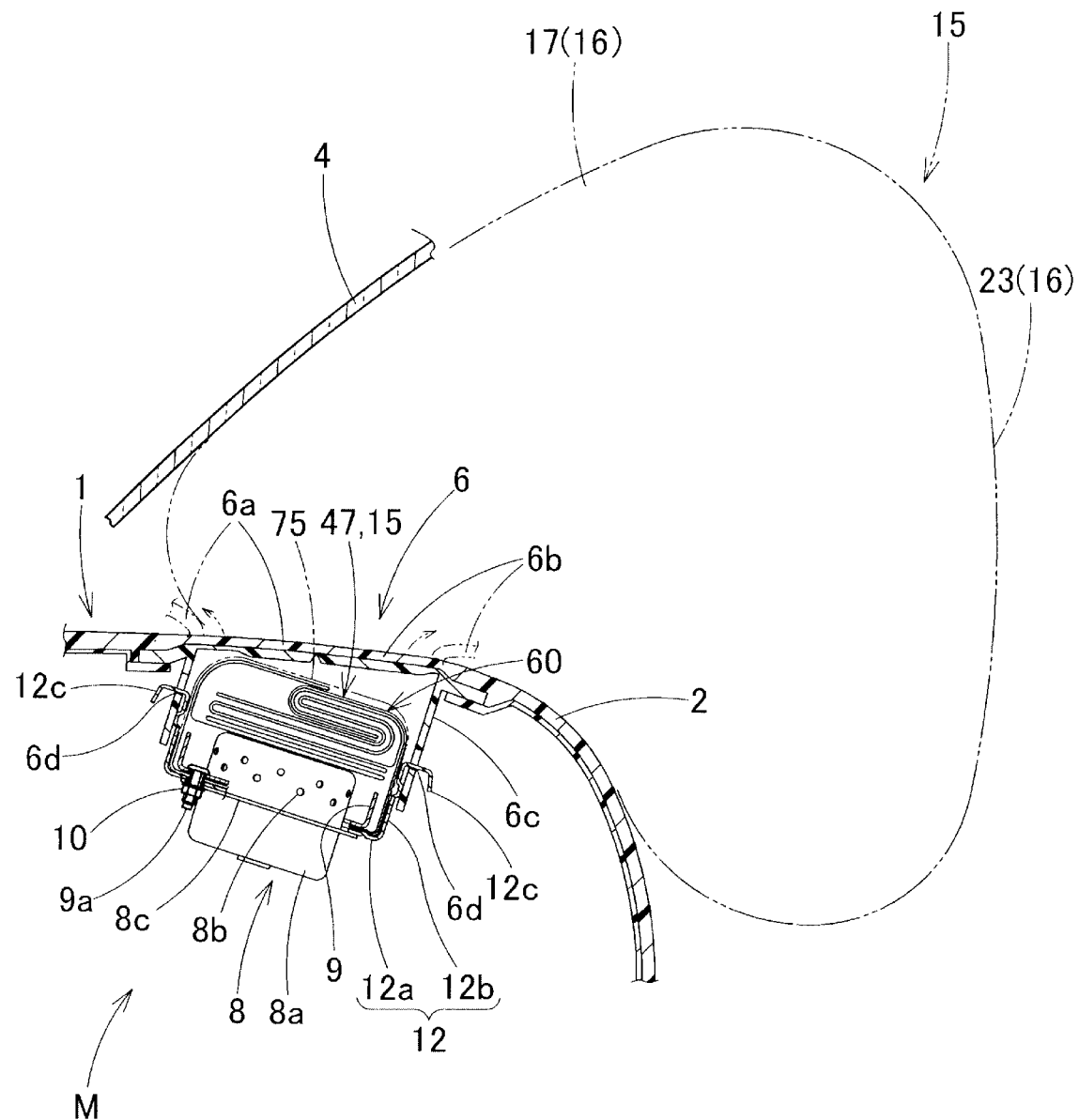
FIG. 1 is a schematic longitudinal sectional view illustrating a state where a passenger seat airbag device according to an embodiment of the present invention is mounted on a vehicle.

An embodiment of the present invention will be described below with reference to the drawings. As illustrated in FIG. 1, a passenger seat airbag device M (hereinafter abbreviated as an "airbag device") according to the embodiment is a top mount type mounted inside an upper surface 2 side of an instrument panel 1 below a windshield 4. The instrument panel 1 according to the embodiment increases a downward amount in a rear lower direction on the upper surface 2 side.

Figure 12:
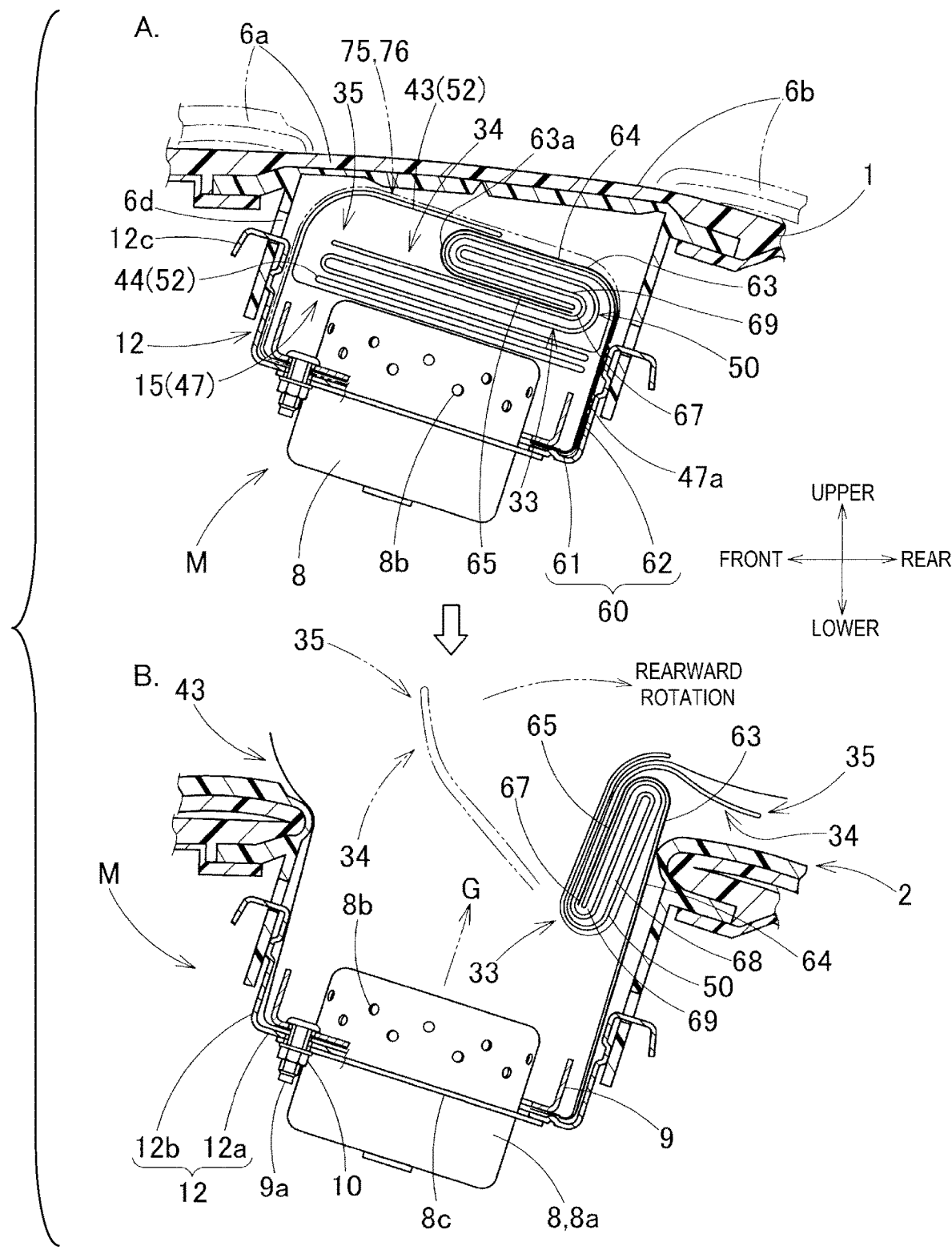
FIG. 12 illustrates a state where the airbag of the passenger seat airbag device according to the embodiment is inflated.

As illustrated in FIGS. 1 and 12, the airbag device M includes a folded airbag 15, an inflator 8 configured to supply inflation gas to the airbag 15, a case 12 serving as a storage part configured to store and hold the airbag 15 and the inflator 8, a retainer 9 configured to attach the airbag 15 and the inflator 8 to the case 12, and an airbag cover 6 configured to cover an upper side of the folded airbag 15. The airbag device M further includes a regulating member 60 configured to regulate deploying and inflating of the airbag 15 and a wrapping material 75 configured to cover a periphery of a fully folded body 47 formed by folding the airbag 15.

The airbag cover 6 is formed integrally with the instrument panel 1 formed of synthetic resin, and includes two door portions 6a, 6b which are pushed by the airbag 15 when the airbag 15 is deployed and inflated and are opened on both front and rear sides. Connecting wall portion 6c connected to the case 12 are formed around the door portions 6a, 6b in the airbag cover 6. Locking holes 6d, through which locking claws 12c of the case 12 are locked, are formed in the connecting wall portions 6c.

The inflator 8 includes a substantially cylindrical main body portion 8a including a plurality of gas discharge ports 8b and a flange portion 8c configured to attach the inflator 8 to the case 12.

The case 12 serving as a storage part is formed in a substantially rectangular parallelepiped shape formed of a sheet metal including a rectangular opening on an upper end side of the case 12, and includes a substantially rectangular plate-shaped bottom wall portion 12a to which the inflator 8 is inserted and attached from below and peripheral wall portions 12b which extend upward from an outer peripheral edge of the bottom wall portion 12a to lock the connecting wall portions 6c of the airbag cover 6. The locking claws 12c, which are inserted into the locking holes 6d of the connecting wall portions 6c to lock the connecting wall portions 6c, are formed at upper ends of the peripheral wall portions 12b.

In the embodiment, the airbag 15 and the inflator 8 are attached to the bottom wall portion 12a of the case 12 by causing bolts 9a of the retainer 9 disposed in the airbag 15 as an attachment unit to pass through an attachment seat 18 (see FIG. 2) on a peripheral edge of the inflow opening 19 (described below) in the airbag 15, the regulating member 60, the wrapping material 75, the bottom wall portion 12a of the case 12 and the flange portion 8c of the inflator 8 and fastening the bolts 9a with nuts 10. A bracket (not illustrated) connected to a vehicle body side is provided on the bottom wall portion 12a of the case 12.

Figure 2:
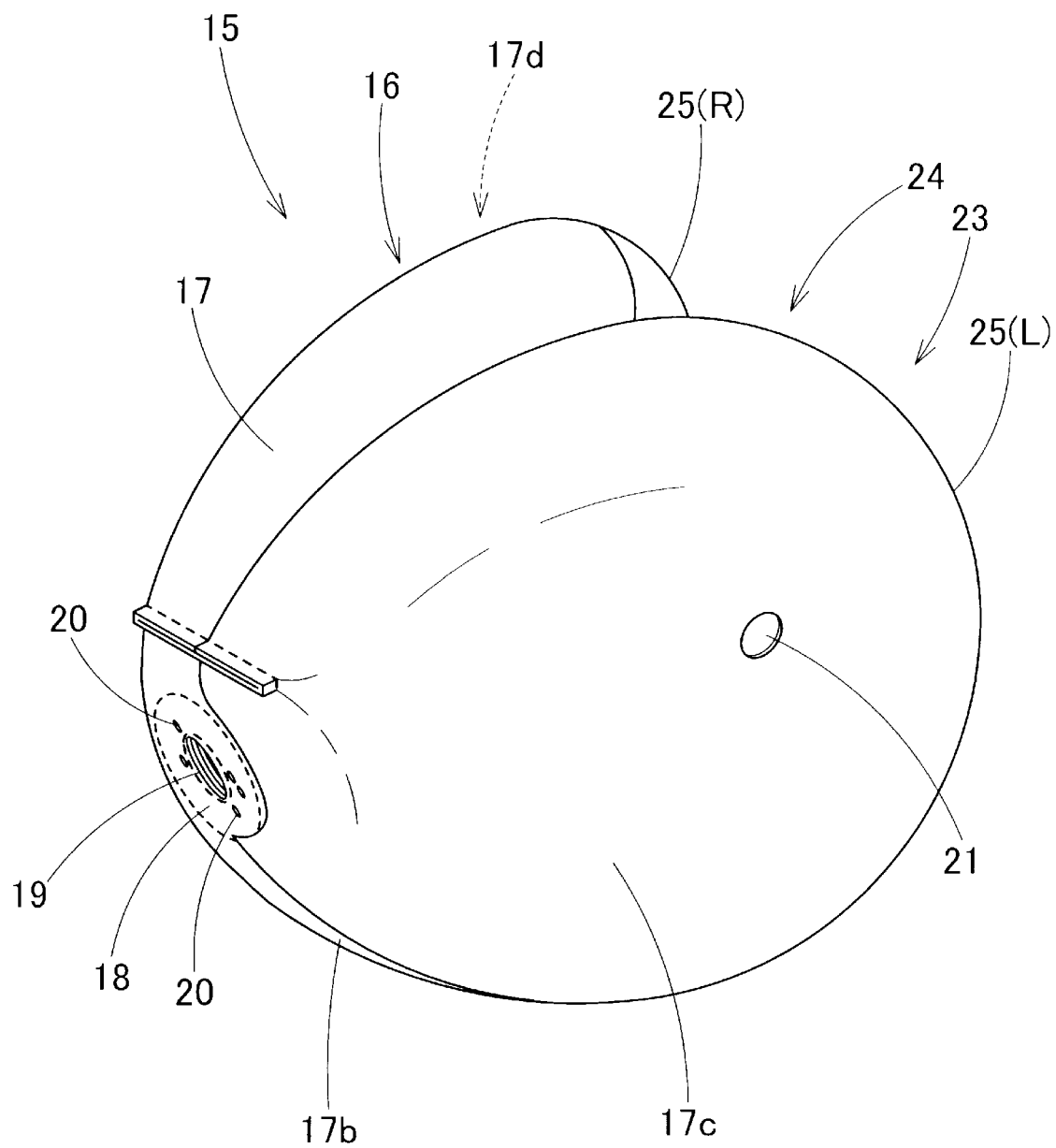
FIG. 2 is a perspective view of an airbag used in the passenger seat airbag device according to the embodiment as viewed from a front side in a state where the airbag alone is inflated.

As indicated by a two-dot chain line in FIG. 1, the airbag 15 has a substantially bag shape and can be arranged so as to close a space between an upper surface 2 of the instrument panel 1 and the windshield 4 above the instrument panel 1 when the airbag 15 is inflated completely. As illustrated in FIG. 2, an outer peripheral wall 16 having a shape when the airbag 15 is inflated completely and alone includes an occupant side wall portion 23 which is provided on a rear end side thereof to receive an occupant, and a peripheral wall portion 17 which extends forward so as to converge from an outer peripheral edge of an occupant side wall portion 23, and an inflow opening 19 circularly opened, through which inflation gas flows into the airbag, is provided at a lower surface of a front end side of the peripheral wall portion 17.

The peripheral wall portion 17 is arranged so as to close the space between the upper surface 2 of the instrument panel 1 and the windshield 4 above the instrument panel 1 when the airbag 15 is inflated completely, and includes an upper wall portion 17a and a lower wall portion 17b which are arranged along substantially a left-right direction on both upper and lower sides of the peripheral wall portion 17, and a left wall portion 17c and a right wall portion 17d which are arranged substantially along a front-rear direction on both left and right sides of the peripheral wall portion 17. A plurality of (four in the embodiment) attachment holes 20, through which the bolts 9a of the retainer 9 are inserted and attached to the bottom wall portion 12a of the case 12, are formed in the peripheral edge of the inflow opening 19 of the lower wall portion 17b serving as the attachment seat 18 attached to the bottom wall portion 12a of the case 12. Vent holes 21, through which excess inflation gas flowing into the airbag 15 is exhausted, are formed in the left wall portion 17c and the right wall portion 17d of the peripheral wall portion 17.

The occupant side wall portion 23 is arranged along a substantially vertical direction on the rear end side of the outer peripheral wall 16 which is an occupant side when the airbag 15 is completely inflated. The occupant side wall portion 23 includes a recess 24 recessed forward at a substantially center in the left-right direction when the airbag 15 is completely inflated, and protruding portions 25 (25L, 25R) protruding rearward relatively are arranged on both left and right sides of the recess 24. That is, in the occupant side wall portion 23 of the airbag 15 according to the embodiment, the recess 24 recessed at the center in the left-right direction and the protruding portions 25L, 25R arranged on both the left and right sides of the recess 24 are continuously arranged along an upper-lower direction when the airbag 15 is completely inflated.

A tether (not illustrated) configured to regulate a shape of the airbag 15 when the airbag 15 is inflated completely and a rectifying cloth (not illustrated) configured to control a flow of inflation gas flowing into the airbag 15 are provided inside the airbag 15.

Figure 3:
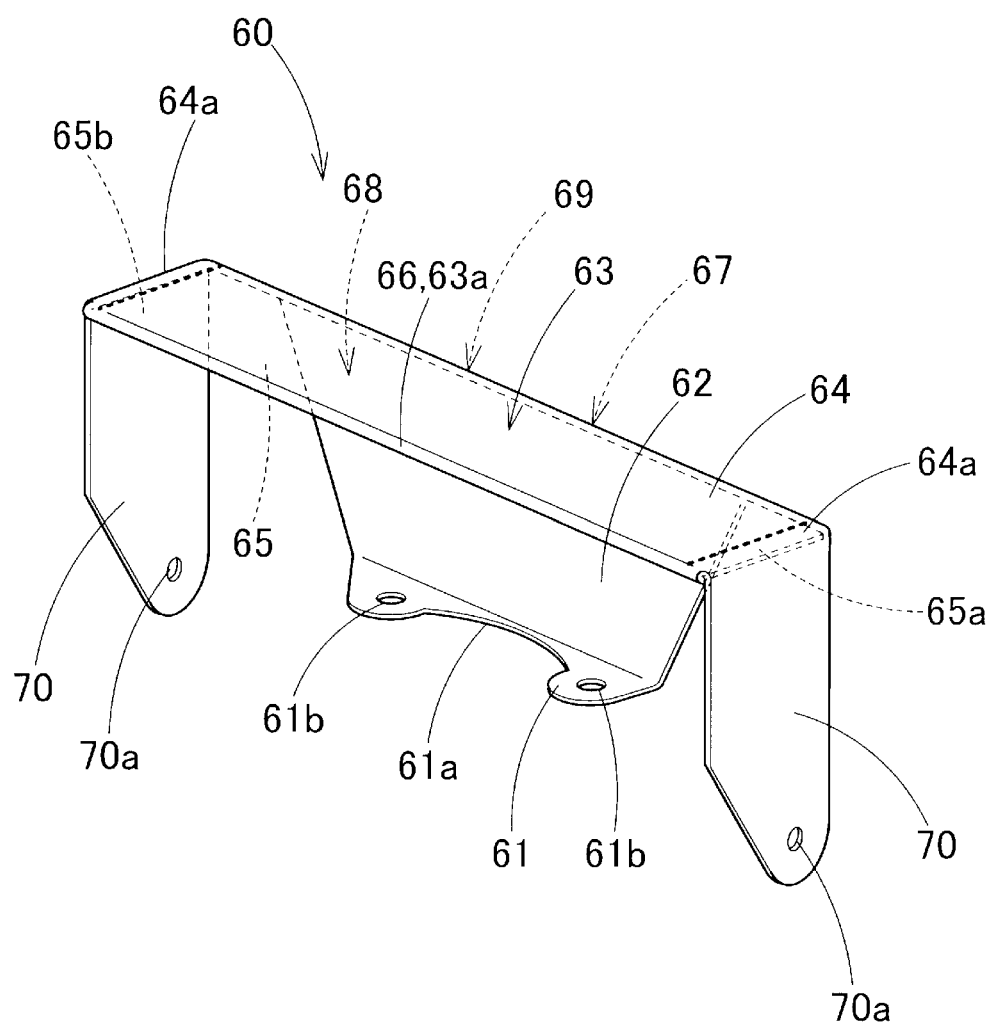
FIG. 3 is a perspective view of a regulating member used in the embodiment.

As illustrated in FIG. 3, the regulating member 60 is formed of a flexible sheet material, and specifically, is formed of a woven fabric which is polyester yarn, polyamide yarn or the like. The regulating member 60 includes a temporary holding portion 63 configured to releasably and temporarily hold a folded part 50 of the folded airbag 15 (the fully folded body 47), an attachment portion 61 attached to the bottom wall portion 12a of the case 12 serving as a storage part, and a flexible connection piece portion 62 connecting the attachment portion 61 and the temporary holding portion 63.

The attachment portion 61 includes a recess 61a recessed in a semicircular shape corresponding to the inflow opening 19, and two attachment holes 61b, through which the bolts 9a of the retainer 9 are inserted, are formed on both sides of the recess 61a. The attachment portion 61 is attached and fixed to the bottom wall portion 12a of the case 12 by being fastened together with the airbag 15 and the inflator 8 when the nuts 10 are fastened to the bolts 9a.

The connection piece portion 62 is provided between the temporary holding portion 63 and the attachment portion 61 in a trapezoidal shape so as to widen a width dimension from the attachment portion 61. The connection piece portion 62 is arranged on a rear surface 47a side of the fully folded body 47 (see A in FIG. 12).

The temporary holding portion 63 includes a rectangular base portion 64 continuous with the connection piece portion 62 and a cover portion 65 arranged so as to face the base portion 64 in a rectangular shape in which a length dimension in the front-rear direction and a width dimension in the left-right direction are substantially equal to those of the base portion 64. A holding recess 68 configured to store the folded part 50 of the airbag 15 so as to temporarily hold the folded part 50 is formed between the cover portion 65 and the base portion 64. The holding recess 68 is configured to store the folded part 50 and is formed in a bag shape by opening a release opening 69 configured to release the folded part 50 on a rear side continuous with the connection piece portion 62 in the base portion 64. That is, the release opening 69 of the temporary holding portion 63 is provided on an inner peripheral side of a release non-connecting edge 67 on a rear edge side which is not connected to a base portion 64 side of an outer peripheral edge of the cover portion 65. Left and right edges 65a, 65b of the cover portion 65 are joined to the base portion 64 by sewing, and an edge of the cover portion 65 opposite to the release non-connecting edge 67 is a connecting edge 66 which is folded from the base portion 64 and is continuous from the base portion 64.

Auxiliary arm portions 70 extending downward from left and right edges 64a of a part of the base portion 64 facing the cover portion 65 are provided in the regulating member 60 according to the embodiment. Attachment holes 70a, through which the bolts 9a of the retainer 9 are inserted, are formed at distal ends of the left and right auxiliary arm portions 70. These auxiliary arm portions 70 are provided so as to further prevent release of the folded portion 50, that is, to prevent inversion of the temporary holding portion 63, and are attached and fixed to the bottom wall portion 12a of the case 12 by being fastened together with the attachment portion 61 when the nuts 10 are fastened to the bolts 9a.

Figure 10:
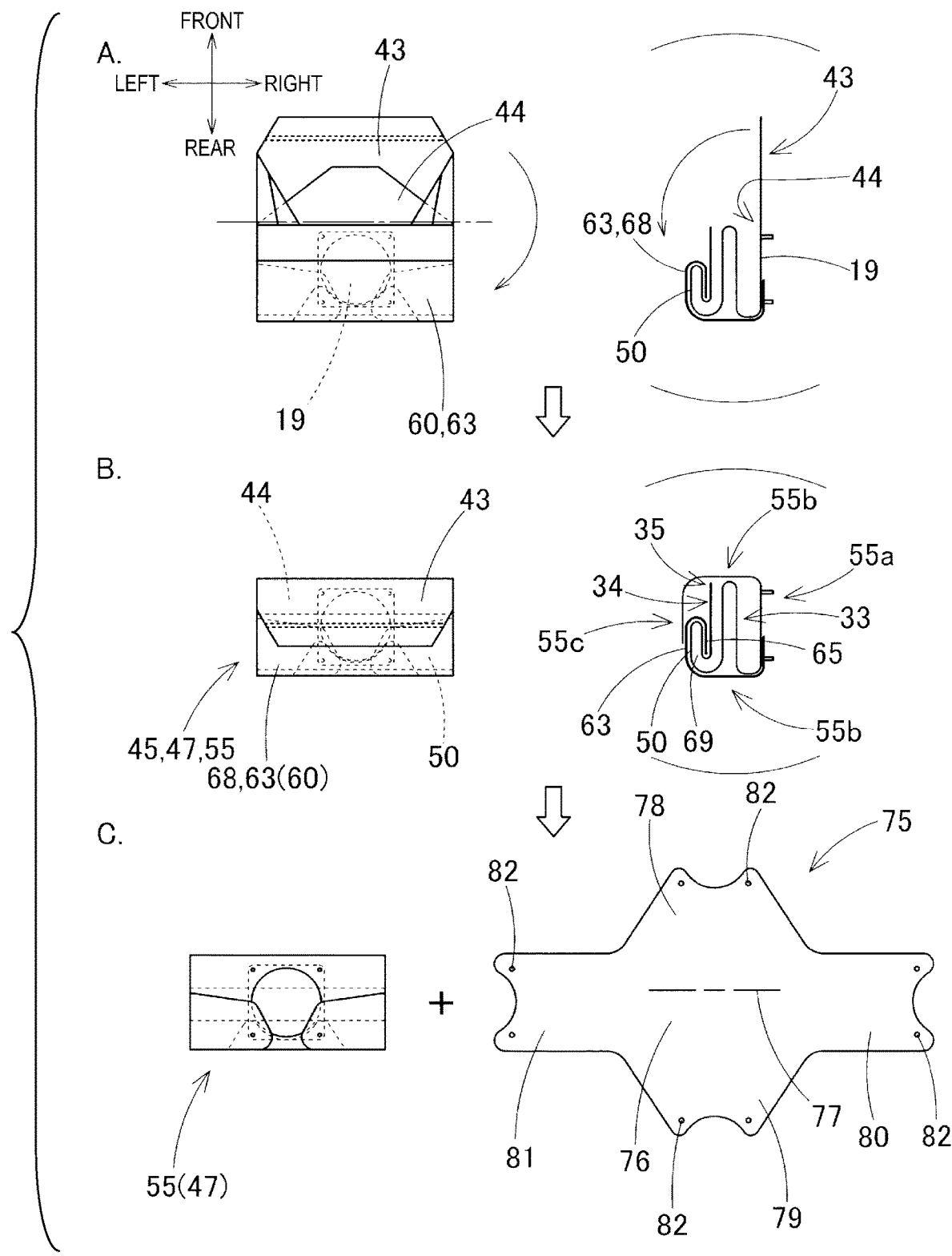
FIG. 10 illustrates the folding step of the airbag according to the embodiment and illustrates a step subsequent to FIG. 9.
Figure 11:
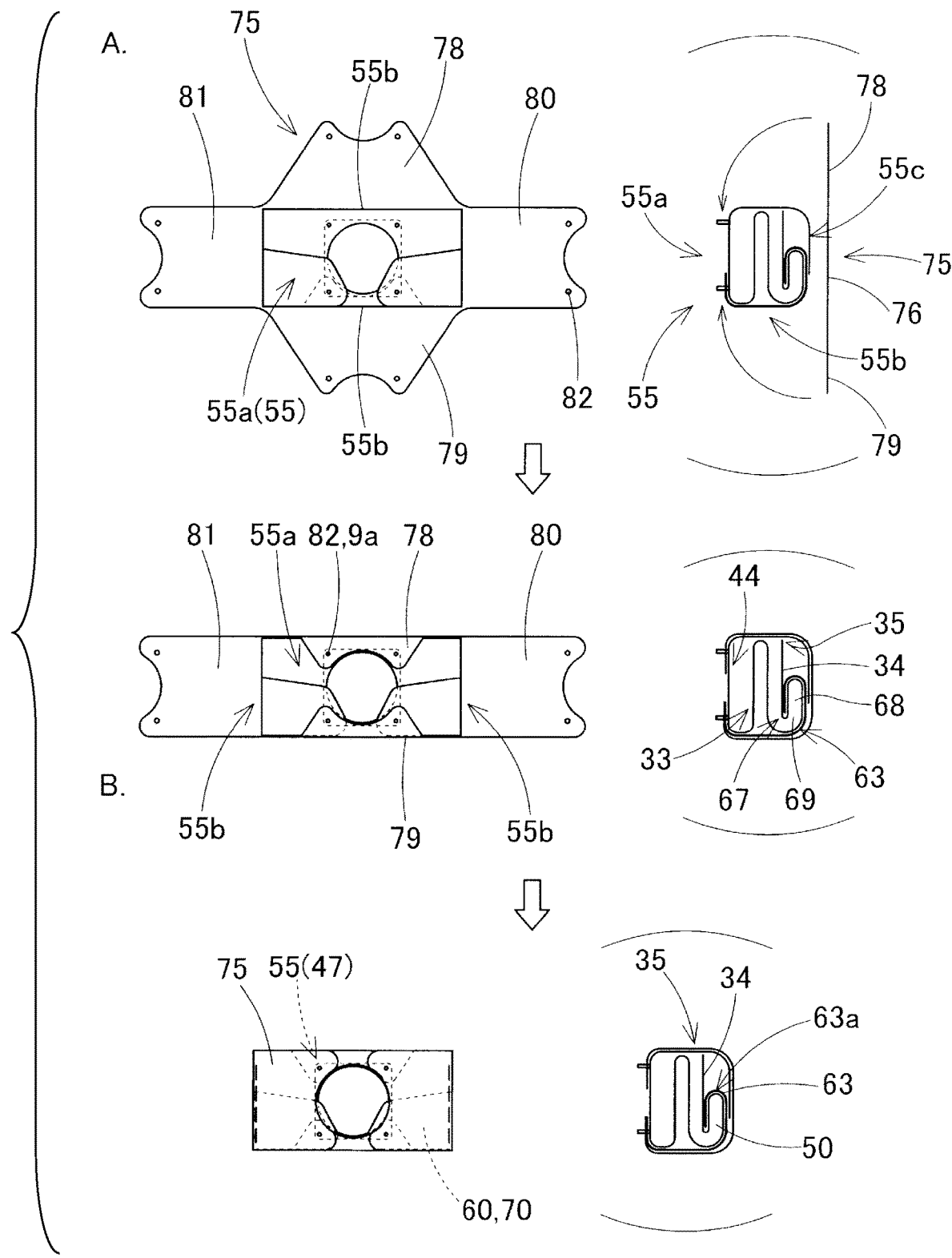
FIG. 11 illustrates the folding step of the airbag according to the embodiment and illustrates a step subsequent to FIG. 10.

As illustrated in FIGS. 10 and 11, the wrapping material 75 is formed of a sheet material which is a flexible nonwoven fabric formed of synthetic fibers such as polyester, or the like. The wrapping material 75 includes a rectangular ceiling side portion 76 configured to cover a ceiling surface (an upper surface) 55c of the fully folded body 47 to which the regulating member 60 is assembled, that is, the airbag body 55, and attachment piece portions 78, 79, 80, 81 extending from the ceiling side portion 76 to front, rear, left and right. At the ceiling side portion 76, a plurality of slits 77 formed intermittently along the left-right direction are provided so as to break the ceiling side portion 76 when the airbag 15 is inflated. The slit 77 is set to be arranged above a vicinity of a distal end (a front end) 63a of the temporary holding portion 63 of the regulating member 60. Locking holes 82, through which the bolts 9a of the retainer 9 protruding from a bottom surface 55a side of an airbag body 55 are inserted, are formed in the attachment piece portions 78, 79, 80, 81.

As illustrated in A to C in FIG. 11, a ceiling surface 55c side of the airbag body 55 is placed on the ceiling side portion 76 of the flatly unfolded wrapping material 75. Then, the airbag body 55 can be wrapped by inserting the bolts 9a into the locking holes 82, sequentially abutting the attachment piece portions 78, 79, 80, 81 on the side surface 55b of the airbag body 55 and locking the bolts 9a.

Next, a folding step of the airbag 15 will be described. First, the bolts 9a are caused to protrude from the attachment holes 20 and the retainer 9 is disposed inside the airbag 15. Then, after a preliminary folding step, the airbag 15 is folded by a left-right direction reducing and folding step of reducing a width dimension in the left-right direction and a front-rear direction reducing and folding step of reducing a width dimension in the front-rear direction, and the regulating member 60 is assembled in a middle of the front-rear direction reducing and folding step.

Figure 4:
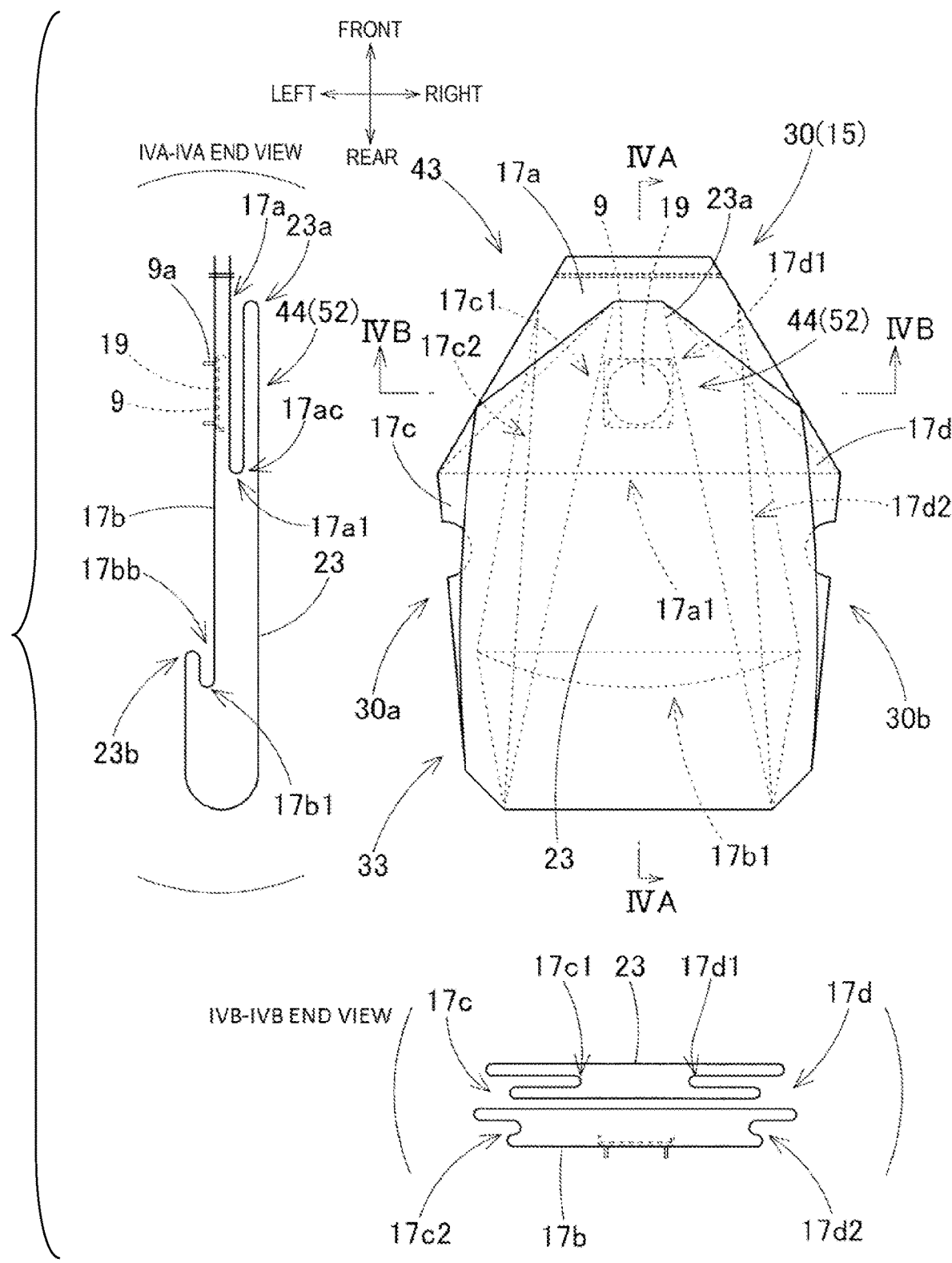
FIG. 4 illustrates a folding step of the airbag according to the embodiment and illustrates the preliminary folded airbag.

In the preliminary folding step, first, as illustrated in FIG. 4, a preliminary folded airbag 30 which is flatly unfolded is formed. The preliminary folded airbag 30 is formed by overlapping the occupant side wall portion 23 on the inflow opening 19, that is, overlapping the occupant side wall portion 23 on the inflow opening 19 on an inner peripheral surface side of the peripheral wall portion 17 and flatly unfolding the occupant side wall portion 23. The preliminary folding airbag 30 is formed by unfolding at least a vicinity of a center of the occupant side wall portion 23 as flat as possible, folding a vicinity of centers 17cc, 17dc of the left wall portion 17c and the right wall portion 17d at left and right of the peripheral wall portion 17 in the upper-lower direction into an inflow opening 19 side with two pair of folds 17c1, 17c2, 17d1, 17d2 being formed, folding a vicinity of a center 17ac of the upper wall portion 17a in the front-rear direction into the inflow opening 19 side with a fold 17a1 being formed, and arranging a lower edge 23b side of the occupant side wall 23 below the lower wall portion 17b with a fold 17b1 being formed at a vicinity of a rear end 17bb of the lower wall portion 17b, so as to facilitate subsequent folding.

The occupant side wall portions 23 arranged above the inflow opening 19 are arranged more on a rear side part 33 side of the inflow opening 19 on a rear side of the inflow opening 19 than on a front side part 43 side of the inflow opening 19 on a front side of the inflow opening 19. An upper edge 23a side of the occupant side wall portion 23 is arranged on the front side of the inflow opening 19, and overlaps with the upper wall portion 17a so as to be an upper part 44 arranged to cover the inflow opening 19 together with the upper wall portion 17a in the subsequent left and right direction reducing and folding step.

Figure 5:
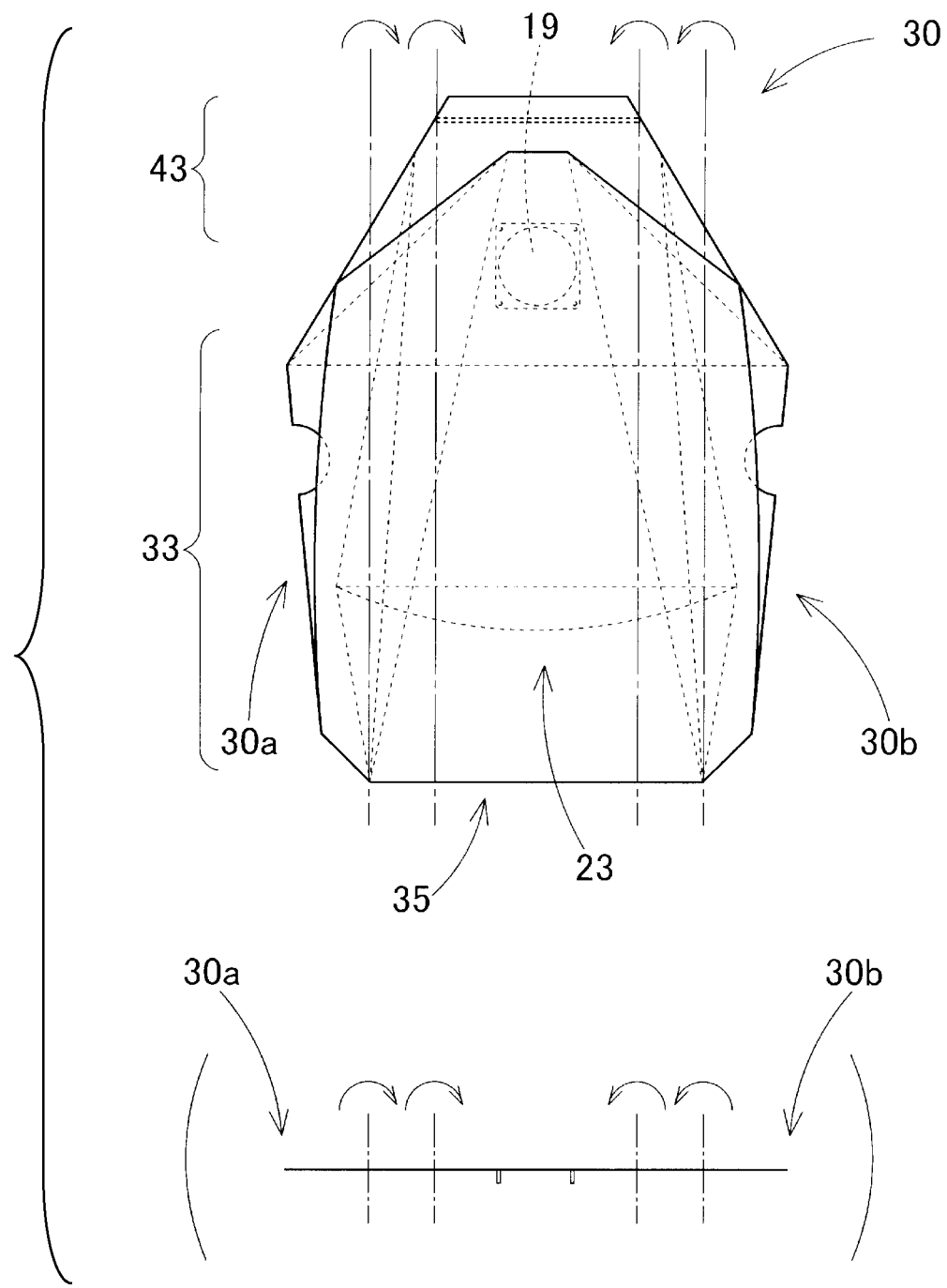
FIG. 5 illustrates the folding step of the airbag according to the embodiment and illustrates a step subsequent to FIG. 4.
Figure 6:
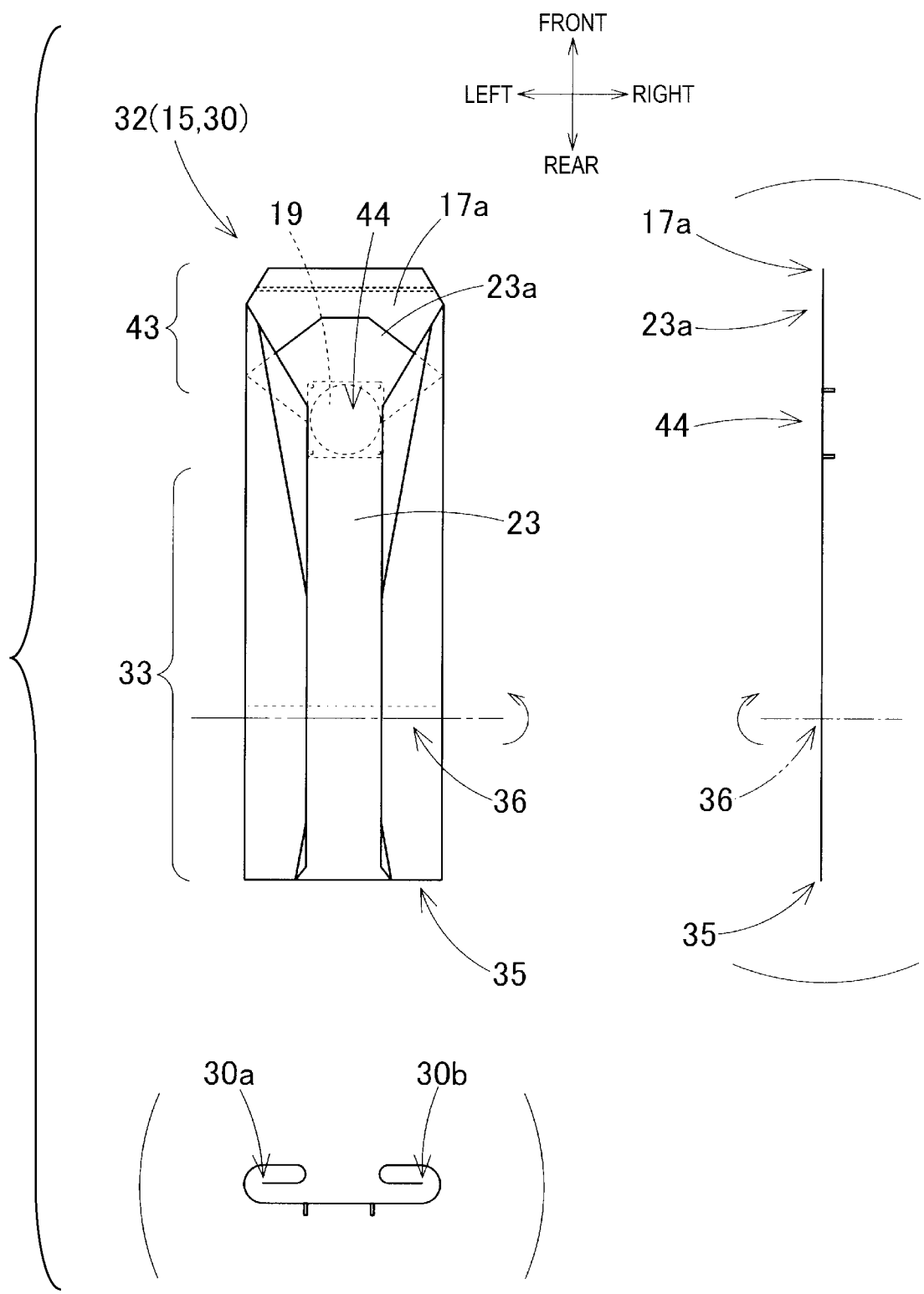
FIG. 6 illustrates the folding step of the airbag according to the embodiment and illustrates a step subsequent to FIG. 5.

In the left-right direction reducing and folding step, in order to reduce a dimension of the preliminary folded airbag 30 in the left-right direction, a left-right direction reduced and folded airbag 32 is formed by folding a left edge side part 30a and a right edge side part 30b at a roll fold wound toward an occupant side wall portion 23 side such that the left edge side part 30a and the right edge side part 30b are close to the inflow opening 19 side as illustrated in FIGS. 5 and 6.

Figure 7:
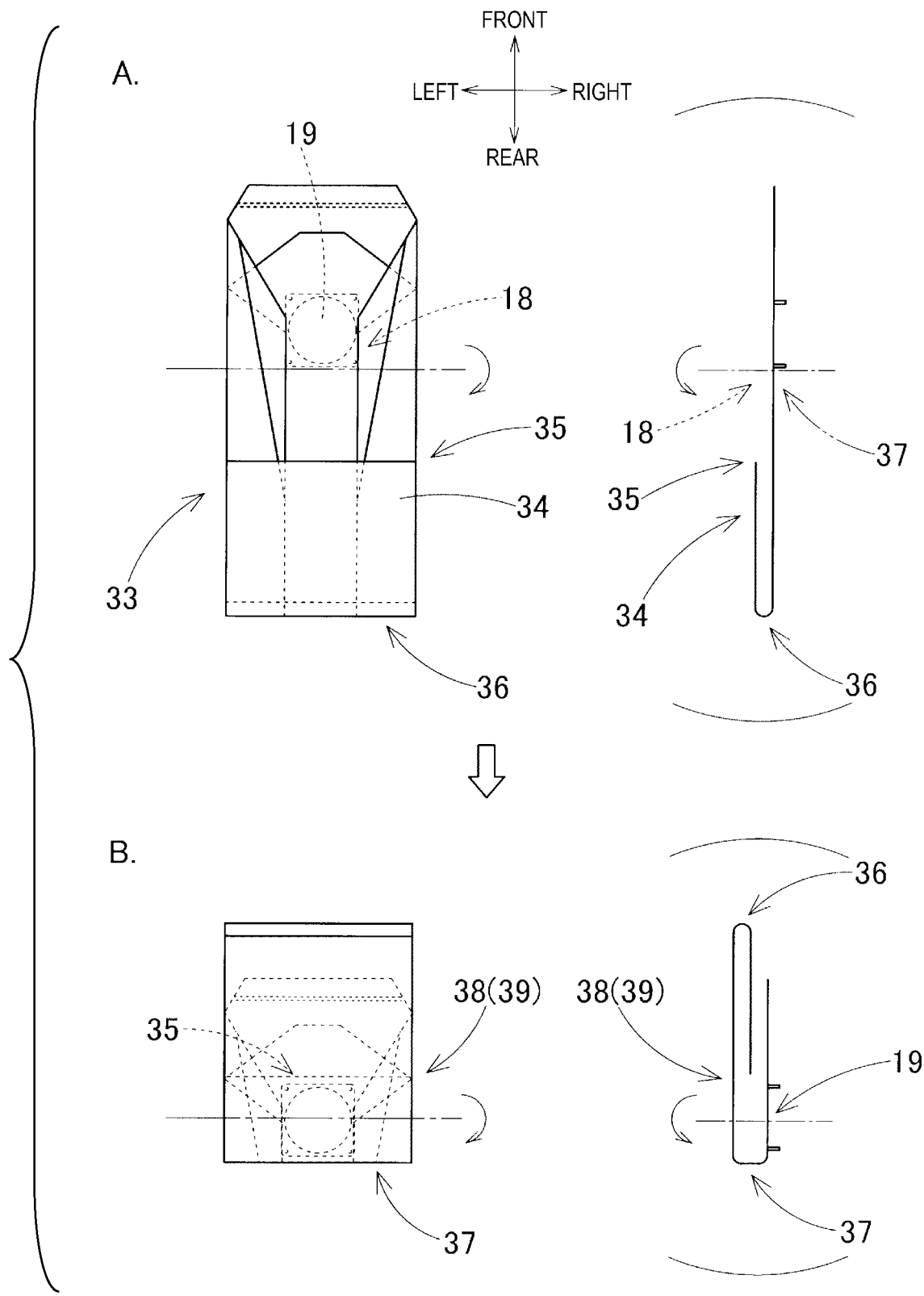
FIG. 7 illustrates the folding step of the airbag according to the embodiment and illustrates a step subsequent to FIG. 6.

Next, in the front-rear direction reducing and folding step, in order to reduce a dimension of the left-right direction reduced and folded airbag 32 in the front-rear direction, first, as illustrated in FIG. 6 and A in FIG. 7, a rear end 35 of the rear side part 33, which is a rear side of the inflow opening 19 of the left-right direction reduced and folded airbag 32 (the preliminary folded airbag 30), is folded forward at a fold 36 along the left-right direction formed at a part closer to the rear end 35 than a vicinity of an intermediate part of the rear end 35 and the inflow opening 19 so as to be close to an upper side of the inflow opening 19. Then, as illustrated in B in FIG. 7, the rear end 35 of the rear side part 33 is folded forward at a fold 37 along the left-right direction formed at a vicinity of the attachment seat 18 in the rear side part 33 so as to be arranged on a front side above the inflow opening 19.

Figure 8:
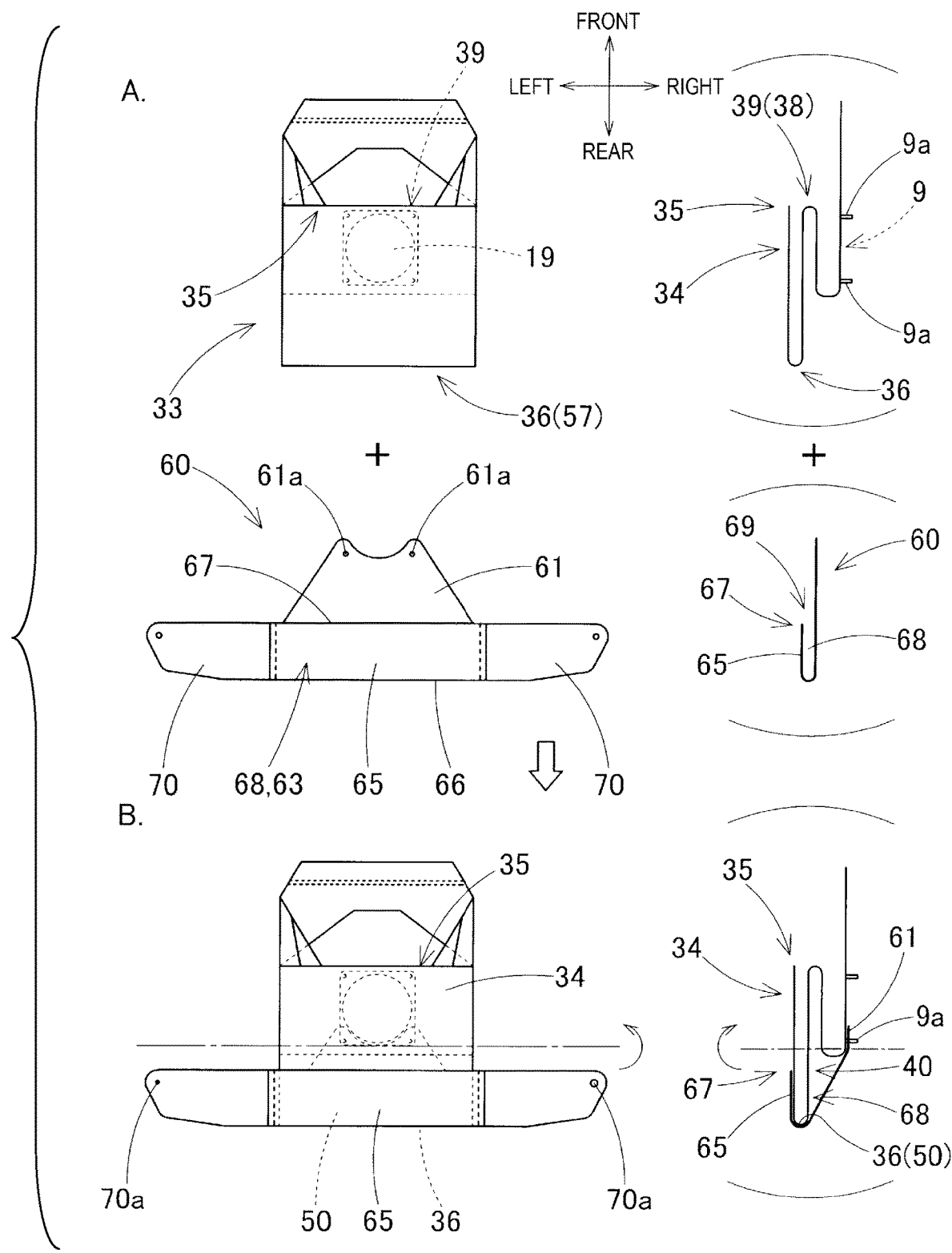
FIG. 8 illustrates the folding step of the airbag according to the embodiment and illustrates a step subsequent to FIG. 7.

Thereafter, as illustrated in B of FIG. 7 and A in FIG. 8, the rear end 35 side is folded back rearward at a fold 39 along the left-right direction formed at an upper part 38 on a front edge side of the inflow opening 19 at the rear side part 33. Then, as illustrated in B in FIG. 8, the bolts 9a of the retainer 9 are inserted the attachment holes 61b, 61b of the attachment portion 61 of the regulating member 60, and the regulating member 60 is attached to the retainer 9. Meanwhile, a vicinity of the fold 36 is inserted into the holding recess 68 of the temporary holding portion 63, and the rear end side part 34 continuous from the rear end 35 is extended forward from the release non-connecting edge 67 in the cover portion 65 of the temporary holding portion 63. The vicinity of the fold 36 is the folded portion 50 stored in the holding recess 68.

Figure 9:
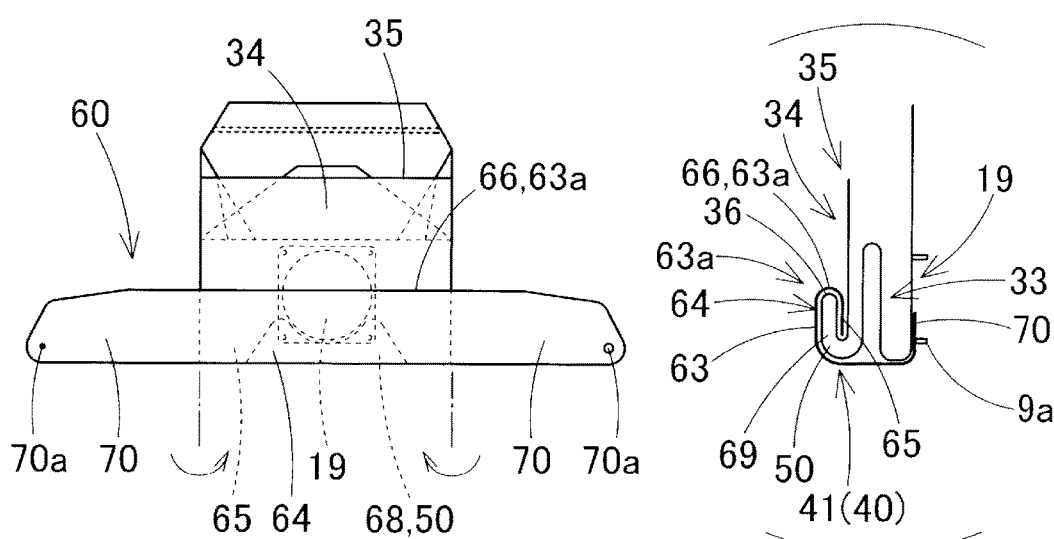
FIG. 9 illustrates the folding step of the airbag according to the embodiment and illustrates a step subsequent to FIG. 8.
Figure 9:
Figure 9:
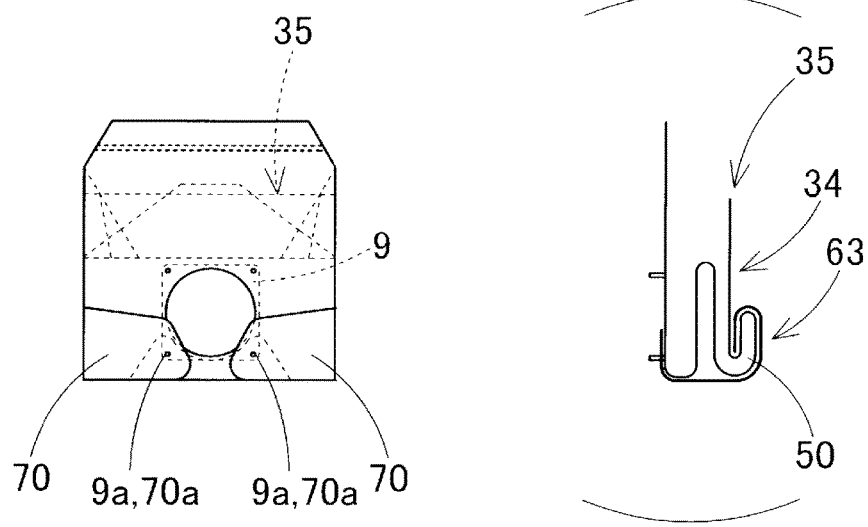

Next, as illustrated in B in FIG. 8 and A in FIG. 9, the temporary holding portion 63 is rotated forward at a fold 41 formed to a separation part 40 away from the fold 36 such that the release opening 69 of the holding recess 68 is directed rearward, that is, the cover portion 65 approaches the inflow opening 19 and the connecting edge 66 of the cover portion 65 and the base portion 64 is arranged on a front side. Then, as illustrated in B in FIG. 9, if the bolts 9a, 9a of the retainer 9 are locked in the attachment holes 70a of the auxiliary arm portions 70, 70 in the regulating member 60, the folded portion 50, which is the vicinity of the fold 36, is stored in the holding recess 68 of the temporary holding portion 63 above the inflow opening 19 and is arranged without displacement.

Next, as illustrated in A and B in FIG. 10, if the front side part 43 of the inflow opening 19 on the front side of the inflow opening 19 is arranged on an upper surface side of the temporary holding portion 63, a front reducing and folding airbag 45 is formed, and the fully folded body 47 of the airbag 15 is formed. At this time, the regulating member 60 is also assembled to the fully folded body 47, so that the airbag body 55 is formed by assembling the regulating member 60 to the fully folded body 47 of the airbag 15. In the airbag body 55, the rear end 35 of the preliminary folded airbag 30 and the left-right direction reduced and folded airbag 32 in the fully folded body 47 is arranged forward of the distal end (front end) 63a of the temporary holding portion 63, and the rear end side part 34 including the rear end 35 is arranged so as to be separated from the rearward release opening 69 and to be extended long toward the front side below the cover portion 65.

Thereafter, as illustrated in C in FIG. 10 and in A, B and C in FIG. 11, in order to prevent the fully folded body 47 from collapsing, the ceiling surface 55c side of the airbag body 55 is placed on the ceiling side portion 76 of the flatly unfolded wrapping material 75. Then, the airbag body 55 is wrapped in the wrapping material 75 by inserting the bolts 9a into the locking holes 82, sequentially abutting the attachment piece portions 78, 79, 80, 81 on the side surface 55b of the airbag body 55 and locking the bolts 9a.

The airbag body 55 wrapped in the wrapping material 75 is stored in the case 12 such that the bolts 9a protrudes from the bottom wall portion 12a of the case 12, and can be attached to the case 12 together with the inflator 8 by inserting the bolts 9a protruding from the bottom wall portion 12a into the flange portion 8c of the inflator 8 and fastening the nuts 10 to the bolts 9a protruding from the flange portion 8c of the inflator 8. Then, the airbag device M can be mounted on the vehicle by inserting the locking claws 12c into the locking holes 6d to lock the peripheral wall portion 12b of the case 12 to the connecting wall portion 6c of the airbag cover 6 in the instrument panel 1 mounted on the vehicle and fixing a predetermined bracket (not illustrated) of the case 12 to the vehicle body side.

When inflation gas is discharged from the gas discharge ports 8b of the inflator 8 at a time of a frontal collision of the vehicle or the like after the airbag device M is mounted on the vehicle, the airbag 15 is inflated by flowing inflation gas G into the airbag 15, thereby breaking the ceiling side portion 76 of the wrapping material 75 and pushing the door portions 6a, 6b of the airbag cover 6 to open. Then, the airbag 15 protrudes upward from the case 12 through an opening formed by pushing and opening the door portions 6a, 6b of the airbag cover 6, and deploys and inflates while protruding toward a vehicle rear side. As indicated by the two-dot chain line in FIG. 1, the airbag 15 is completely inflated so as to close the space between the upper surface 2 of the instrument panel 1 and the windshield 4 above the instrument panel 1.

Then, in the airbag device M according to the embodiment, when the inflation gas G flows into the airbag 15, a state where the temporary holding portion 63 of the regulating member 60 temporarily holds the folded part 50 of the airbag 15 is maintained, and initial deploying and inflating parts 52, which are not stored and held in the temporary holding portion 63 in the airbag 15 and are upstream of the inflation gas G than the folded part 50, are deployed and inflated, as illustrated in A and B in FIG. 12. In the embodiment, the initial deploying and inflating parts 52 are the front side part 43 of the airbag 15 and the upper part 44 immediately above the inflow opening 19.

Due to the inflation of the initial deploying and inflating parts 52, an upper wall portion 17a side of the airbag 15 and the upper edge 23a side of the occupant side wall portion 23 protrude rapidly (see a two-dot chain line in FIG. 14), and the temporary holding portion 63 of the regulating member 60 is pushed up.

Figure 13:
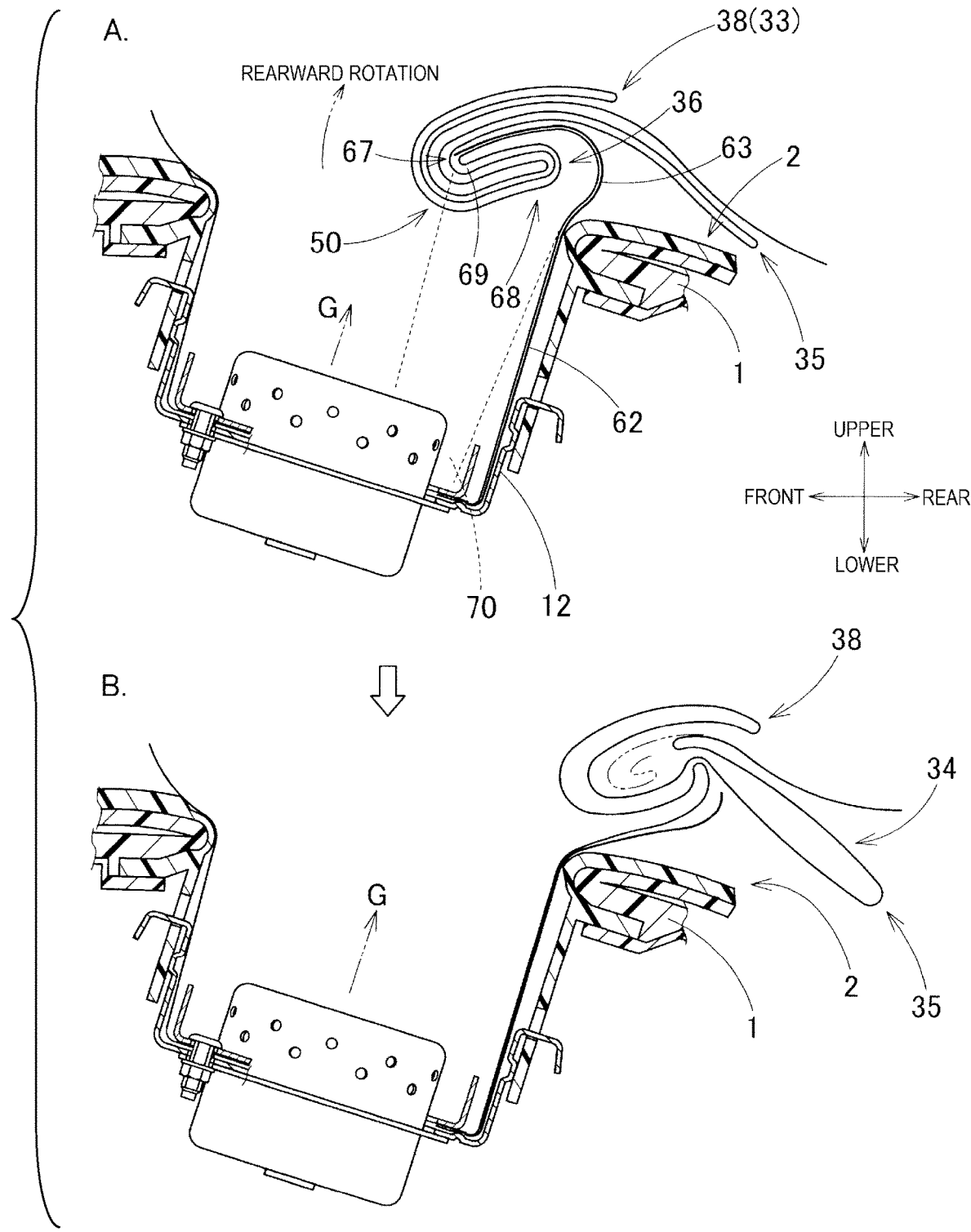
FIG. 13 illustrates a state where the airbag of the passenger seat airbag device according to the embodiment is inflated and illustrates a state after FIG. 12.
Figure 14:
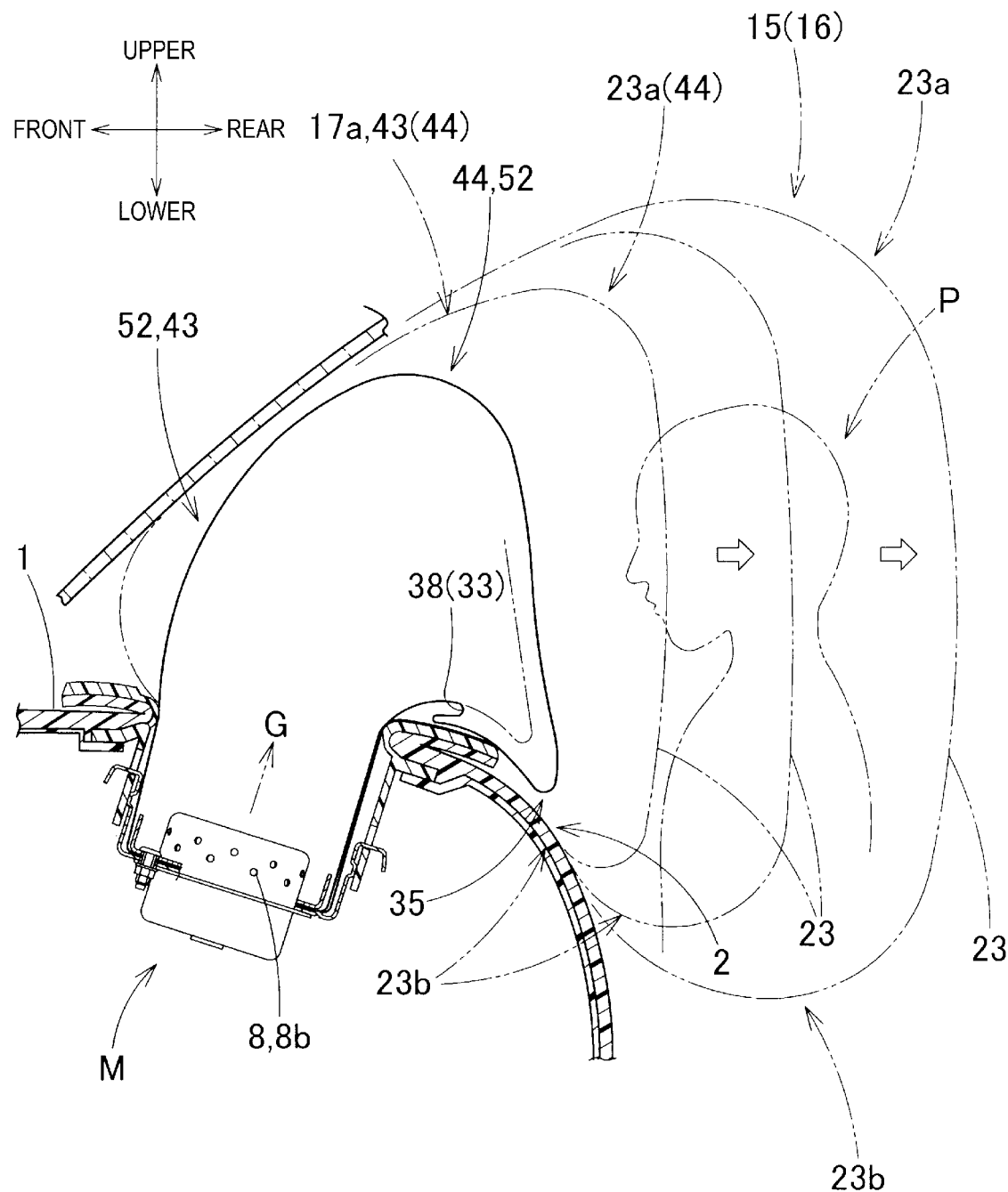
FIG. 14 is a schematic view illustrating a state where the airbag of the passenger seat airbag device according to the embodiment is inflated.

When the inflation gas G flows into the folded airbag 15, in the rear side part 33 of the preliminary folded airbag 30 (the left-right direction reduced and folded airbag 32) as illustrated in B in FIG. 12 and A and B in FIG. 13, the inflation gas G flows into the folded part 50 stored in the temporary holding portion 63 of the regulating member 60 to bend the connection piece portion 62 and the auxiliary arm portion 70, and the temporary holding portion 63 is rotated rearward to release the folded part 50 from the release opening 69. At this time, as illustrated in A in FIG. 12, the rear end side part 34 of the rear side part 33, which extends forward from the release opening 69 at a lower side of the cover portion 65 of the temporary holding portion 63, rotates the rear end 35 upward and further rotates the rear end 35 rearward in accordance with the rotation of the temporary holding portion 63 as illustrated in B in FIG. 12 and in A and B in FIG. 13. Therefore, prior to releasing the folded part 50 from the temporary holding portion 63, the rear end side part 34 of the rear side part 33 rotates upward from a lower side of the temporary holding portion 63 rotating rearward and further rotates rearward, so that the rear end side part 34 is separated from the case 12 serving as a storage part and approaches the upper surface 2 of the instrument panel 1. The folded part 50 stored in the temporary holding portion 63 is released from the release opening 69 of the temporary holding portion 63 and moves rearward while being deployed and inflated. Therefore, rearward movement of the rear end side part 34 of the rear side part 33 is promoted, and as illustrated in FIG. 14, the rear end side part 34 of the rear side part 33 moves rearward along the upper surface 2 of the instrument panel 1. Then, the occupant side wall portion 23 in the outer peripheral wall 16 of the airbag 15 moves rearward while being widely deployed substantially along the upper-lower direction, so that the airbag 15 is completely inflated. That is, in the airbag device M according to the embodiment, the rear end side part 34 of the rear side part 33 of the preliminary folded airbag 30 is separated from the case 12 serving as a storage part and approaches the upper surface 2 side of the instrument panel 1 prior to releasing the folded part 50 stored in the temporary holding portion 63 of the regulating member 60. When the folded part 50 is opened from the release opening 69 and is deployed and inflated rearward, the folded part 50 moves rearward along the upper surface 2 of the instrument panel 1 while being deployed and inflated. Therefore, the occupant side wall portion 23 is widely deployed from the upper edge 23a at an upper side of the occupant side wall portion 23 to the lower edge 23b at a lower side of the occupant side wall portion 23 and moves rearward, so that the airbag 15 is completely inflated.

Therefore, in the airbag device M according to the embodiment, when the airbag 15 is deployed and inflated, the rear end 35 side of the preliminary folded airbag 30 can be rapidly separated from the case 12 and be deployed along the upper surface 2 of the instrument panel 1. Therefore, the occupant side wall portion 23 of the airbag 15 can be rapidly and widely deployed in the upper-lower direction, for example, the airbag device M is mounted on a vehicle in which the downward direction of the upper surface 2 side of the instrument panel 1 is increased, so that even when an occupant P is approaching (see the two-dot chain line in FIG. 14), the airbag 15 in a middle of the inflation can smoothly receive and protect the occupant P by the occupant side wall portion 23 widely deployed in the upper-lower direction.

In the airbag device M according to the embodiment, the airbag 15 is folded and stored in the case 12 serving as a storage part such that the rear end 35 of the preliminary folded airbag 30 is arranged in front of a front end 63a of the temporary holding portion 63.

Therefore, in the embodiment, a length of the rear end side part 34 in the rear side part 33 of the preliminary folded airbag 15 extending from the release opening 69 of the temporary holding portion 63 is increased. Therefore, the rear end 35 of the rear side part 33 is separated from the case 12, and is further arranged on the rear side along the upper surface 2 of the instrument panel 1 by the rotation in accordance with the rearward rotation of the temporary holding portion 63 in an initial stage of the inflation of the airbag 15. Subsequent deploying of the occupant side wall portion 23 in the upper-lower direction is performed more smoothly, so that the occupant side wall portion 23 widened in the upper-lower direction can smoothly receive and protect the approaching occupant.

If the above points are not taken into consideration, the rear end 35 may be arranged at the same position as the front end 63a of the temporary holding portion 63 or on the rear side. As long as the rear end 35 is separated out from the holding recess 68 below the cover portion 65, the rear end side part 34 may be folded.

In the embodiment, the regulating member 60 includes the auxiliary arm portion 70. However, a regulating member which does not include the auxiliary arm portion 70 may be used.

The invention claimed is:
1. A passenger seat airbag device comprising:
an airbag which is folded and stored in a storage part on an upper surface side of an instrument panel in front of a passenger seat of a vehicle and is configured to protrude rearward while being deployed and inflated from the storage part to complete inflation when inflation gas flows into the airbag; and
a regulating member which is attached to the storage part so as to regulate deploying and inflating of a part of the airbag when the airbag is deployed and inflated,
wherein the regulating member has flexibility and includes:
a temporary holding portion which is configured to temporarily and releasably hold a folded part of the folded airbag;
an attachment portion which is attached to the storage part; and
a connection piece portion which connects the attachment portion and the temporary holding portion,
wherein the temporary holding portion includes:
a base portion which is continuous to the connection piece portion; and
a cover portion which is connected to the base portion so as to form a holding recess configured to temporarily hold the folded part between the cover portion and the base portion and is arranged below the base portion when the folded part is temporarily held,
wherein the temporary holding portion is configured such that a release opening which is configured to release the folded part from the holding recess is arranged to face rearward, and the folded part is released from the release opening while the temporary holding portion rotating rearward at a time of releasing the folded part when the airbag is deployed and inflated,
wherein an outer peripheral wall at a completion of inflation of the airbag includes:
an occupant side wall portion which is provided on a rear side thereof to receive an occupant; and
a peripheral wall portion which extends forward so as to converge from an outer peripheral edge of the occupant side wall portion,
wherein an inflow opening, through which the inflation gas flows into the airbag, is provided at a lower surface of a front end side of the peripheral wall portion,
wherein a fully folded body of the airbag stored in the storage part is formed by performing:
after forming a preliminary folded airbag by flatly unfolding the airbag such that the occupant side wall portion of the airbag is arranged above the inflow opening, a left-right direction reducing and folding step of narrowing a width dimension in a left-right direction of the preliminary folded airbag; and
a front-rear direction reducing and folding step of arranging a rear side part on a rear side and a front side part on a front side of the preliminary folded airbag, above the inflow opening, respectively with the inflow opening of the preliminary folded airbag as a center,
wherein a part of the rear side part is stored in the temporary holding portion as the folded part, and
wherein the airbag is folded and stored in the storage part while the rear end side including a rear end of the preliminary folded airbag is arranged below the cover portion such that the rear end side is out of the temporary holding portion and extends forward from the release opening.

2. The passenger seat airbag device according to claim 1, wherein the airbag is folded and stored in the storage part while the rear end of the preliminary folded airbag is arranged in front of the temporary holding portion.

\* \* \* \* \*